United States Patent
Takamizawa et al.

(10) Patent No.: US 12,422,638 B2
(45) Date of Patent: Sep. 23, 2025

(54) OPTICAL WIRING UNIT AND OPTICAL TERMINATION BOX

(71) Applicant: Fujikura Ltd., Tokyo (JP)

(72) Inventors: Hiroyuki Takamizawa, Sakura (JP); Toshiaki Nakajima, Sakura (JP); Hiroyoshi Shibata, Sakura (JP)

(73) Assignee: Fujikura Ltd., Tokyo (JP)

( * ) Notice: Subject to any disclaimer, the term of this patent is extended or adjusted under 35 U.S.C. 154(b) by 319 days.

(21) Appl. No.: 18/023,924

(22) PCT Filed: May 6, 2021

(86) PCT No.: PCT/JP2021/017394
§ 371 (c)(1),
(2) Date: Feb. 28, 2023

(87) PCT Pub. No.: WO2022/091462
PCT Pub. Date: May 5, 2022

(65) Prior Publication Data
US 2023/0324639 A1 Oct. 12, 2023

(30) Foreign Application Priority Data
Oct. 28, 2020 (JP) .................. 2020-180584

(51) Int. Cl.
*G02B 6/00* (2006.01)
*G02B 6/44* (2006.01)

(52) U.S. Cl.
CPC ..... *G02B 6/44526* (2023.05); *G02B 6/44528* (2023.05); *G02B 6/4455* (2013.01); *G02B 6/44785* (2023.05)

(58) Field of Classification Search
CPC .............. G02B 6/4455; G02B 6/4441; G02B 6/44785; G02B 6/44526; G02B 6/00
See application file for complete search history.

(56) References Cited

U.S. PATENT DOCUMENTS

| 5,835,657 | A | 11/1998 | Suarez et al. |
| 6,845,207 | B2 * | 1/2005 | Schray ............... G02B 6/3897 385/135 |

(Continued)

FOREIGN PATENT DOCUMENTS

| JP | 2010262115 A | 11/2010 |
| JP | 2012027193 A | 2/2012 |

(Continued)

OTHER PUBLICATIONS

International Search Report issued in corresponding International Application No. PCT/JP2021/017394; mailed Jul. 20, 2021 (3 pages).

*Primary Examiner* — Jennifer Doan
(74) *Attorney, Agent, or Firm* — Osha Bergman Watanabe & Burton LLP

(57) ABSTRACT

An optical wiring unit includes: a tray that includes a bottom plate; and a lid body that includes a top plate facing the bottom plate in an up-down direction. An accommodating space that accommodates an optical fiber is formed between the bottom plate and the top plate. one of the tray and the lid body includes: an outer wall portion; and an inner wall portion inside the accommodating space with respect to the outer wall portion. The other of the tray and the lid body includes an intermediate wall portion inserted between the outer wall portion and the inner wall portion. The inner wall portion has a dimension in the up-down direction smaller than that of the outer wall portion.

6 Claims, 7 Drawing Sheets

(56) References Cited

U.S. PATENT DOCUMENTS

| | | |
|---|---|---|
| 7,274,852 B1 | 9/2007 | Smrha et al. |
| 2014/0205254 A1 | 7/2014 | Rudenick et al. |
| 2017/0082815 A1* | 3/2017 | Takeuchi ............. G02B 6/3897 |

FOREIGN PATENT DOCUMENTS

| | | |
|---|---|---|
| JP | 2015122454 A | 7/2015 |
| JP | 5800231 B2 | 10/2015 |
| JP | 2018530782 A | 10/2018 |

* cited by examiner

OPTICAL WIRING UNIT AND OPTICAL TERMINATION BOX

TECHNICAL FIELD

The present invention relates to an optical wiring unit and an optical termination box. Priority is claimed on Japanese Patent Application No. 2020-180584 filed Oct. 28, 2020, the content of which is incorporated herein by reference.

BACKGROUND

Patent Document 1 discloses a tray that accommodates an optical fiber and is devised to prevent the optical fiber from being sandwiched when a plurality of trays are stacked and used.

PATENT LITERATURE

Patent Document 1

Japanese Patent No. 5800231

SUMMARY OF INVENTION

There is a case where a tray and a lid body may be combined and used as an optical wiring unit. In such an optical wiring unit, there is a possibility that the optical fiber may be sandwiched and pressed between the tray and the lid body due to, for example, vibration or the like. When the optical fiber is pressed, there is a case where an increase in transmission loss of light, or the like may be caused.

SUMMARY

One or more embodiments of the present invention provide an optical wiring unit or an optical termination box that can suppress the sandwiching and pressing of an optical fiber between a tray and a lid body.

An optical wiring unit according to one or more embodiments of the present invention includes a tray that has a bottom plate; and a lid body that has a top plate facing the bottom plate in an up-down direction. An accommodating space that accommodates an optical fiber is formed between the bottom plate and the top plate. One of the tray and the lid body has an outer wall portion and an inner wall portion arranged inside the accommodating space with respect to the outer wall portion. The other of the tray and the lid body has an intermediate wall portion inserted between the outer wall portion and the inner wall portion. The inner wall portion has a dimension in the up-down direction smaller than that of the outer wall portion.

According to one or more embodiments, even when the optical wiring unit vibrates or is turned upside down and used, the sandwiching and pressing of the optical fiber between the tray and the lid body can be suppressed.

In the optical wiring unit according to one or more embodiments, the tray may have a tray-side fiber restricting portion that protrudes into the accommodating space from the bottom plate, the lid body may have a lid-side fiber restricting portion that protrudes into the accommodating space from the top plate, and one of the tray-side fiber restricting portion and the lid-side fiber restricting portion may be inserted into the other.

In the optical wiring unit according to one or more embodiments, the optical wiring unit may further include a clamp that is arranged in the accommodating space, the clamp may be bonded to one of the tray and the lid body and a peeling suppressing portion may be formed on the other of the tray and the lid body, and the peeling suppressing portion may protrude in the up-down direction from the bottom plate or the top plate and faces the clamp in the up-down direction.

According to one or more embodiments, an optical termination box includes a plurality of the optical wiring units according to any one of the above described embodiments, a central rail configured to support the plurality of optical wiring units to be slidable in a front-rear direction; and a housing configured to accommodate the plurality of optical wiring units and the central rail. The plurality of optical wiring units are arranged to be divided into both sides in a left-right direction orthogonal to both the up-down direction and the front-rear direction with respect to the central rail. In the optical wiring unit located on one side in the left-right direction, the lid body is located above the tray, and in the optical wiring unit located on the other side in the left-right direction, the tray is located above the lid body.

According to such a configuration, by turning the optical wiring unit upside down on the right side and the left side of the central rail and using the optical wiring unit, it is possible to share the optical wiring unit, thereby reducing the manufacturing cost and the management cost. Moreover, as described above, even when the optical wiring unit is turned upside down and used, an optical fiber being pressed is suppressed.

According to one or more of embodiments of the present invention, it is possible to provide the optical wiring unit or the optical termination box that can suppress the sandwiching and pressing of an optical fiber between the tray and the lid body.

DETAILED DESCRIPTION

Figure 1:
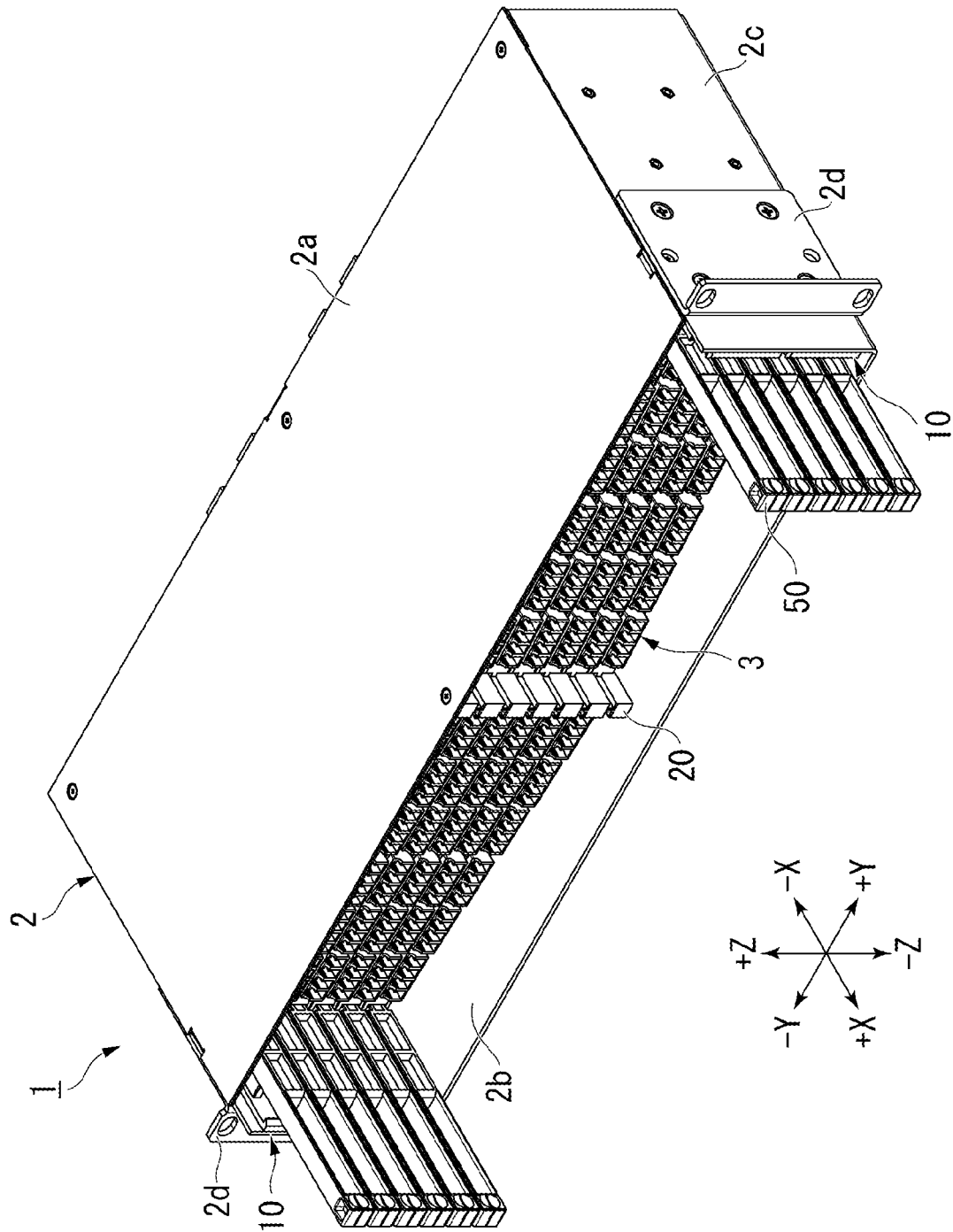
FIG. 1 is a perspective view of an optical termination box according to one or more embodiments.

An optical wiring unit of one or more embodiments and an optical termination box including the optical wiring unit will be described below with reference to the drawings. As shown in FIG. 1, the optical termination box 1 includes a housing 2, a plurality of optical wiring units 3, a plurality of side rails 10, and a central rail 20. Each optical wiring unit 3 is configured to be slidable with respect to the housing 2 in a state in which the optical wiring unit 3 is supported by the side rails 10 and the central rail 20.

As shown in FIGS. 2 to 5, the optical wiring unit 3 includes a tray 30, a lid body 40, an operating member 50, a slide piece 60, a plurality of first adapters A1, and a plurality of second adapters A2. The operating member 50 protrudes from the tray 30. The tray 30, the lid body 40, the operating member 50, and the slide piece 60 may be molded products made of resin.

(Definition of Direction)

In one or more embodiments, a longitudinal direction of the operating member 50 is referred to as a front-rear direction X. In the front-rear direction X, a side (+X side) where the operating member 50 protrudes from the tray 30 is referred to as a front side, and the opposite side (−X side) is referred to as a rear side. A direction in which the tray 30 and the lid body 40 face each other is referred to as an up-down direction Z. In the up-down direction Z, a +Z side is referred to as an upper side, and a −Z side is referred to as a lower side. A direction orthogonal to both the front-rear direction X and the up-down direction Z is referred to as a left-right direction Y. In the left-right direction Y, one side (+Y side) is referred to as a right side, and the opposite side (−Y side) is referred to as a left side. In addition, the up-down direction Z may not coincide with the vertical direction.

The front-rear direction X is also a direction (sliding direction) in which the optical wiring unit 3 slides with respect to the housing 2. As shown in FIG. 1, the position of the optical wiring unit 3 in a state in which the tray 30 is stored inside the housing 2 is referred to as a "storage position". The optical wiring unit 3 is movable to a "pull-out position" where the tray 30 is pulled out of the housing 2 by sliding from the storage position to the front side.

As shown in FIG. 1, the housing 2 has an upper plate 2*a*, a lower plate 2*b*, and a pair of side plates 2*c*. The upper plate 2*a* and the lower plate 2*b* face each other in the up-down direction Z, and the pair of side plates 2*c* face each other in the left-right direction Y. A fixing member 2*d* that fixes the optical termination box 1 to an external structure (wall, pillar, cabinet, or the like) is provided on an outer side surface of each side plate 2*c* in the left-right direction Y. Even in a case where the optical wiring unit 3 is in the storage position, the operating member 50 of the optical wiring unit 3 protrudes from an opening portion of the front side of the housing 2 toward the front side.

A back plate (stopper) (not shown) is provided at a rear end portion of the housing 2. The back plate partially covers the rear end portion of the housing 2 and serves as a stopper when the optical wiring unit 3 is made to slide toward the rear side. When the optical wiring unit 3 is in the storage position, each second adapter A2 protrudes from the housing 2 through a portion (a rear opening portion of the housing 2) toward the rear side where the back plate is not provided. Accordingly, an external optical connector can be connected to the second adapter A2. In addition, a specific configuration of the stopper that restricts the movement toward the rear side of the optical wiring unit 3 beyond the storage position is not limited to the back plate of the housing 2, and can be changed appropriately. For example, the side rails 10, the central rail 20, and the like may have stoppers.

Figure 2:
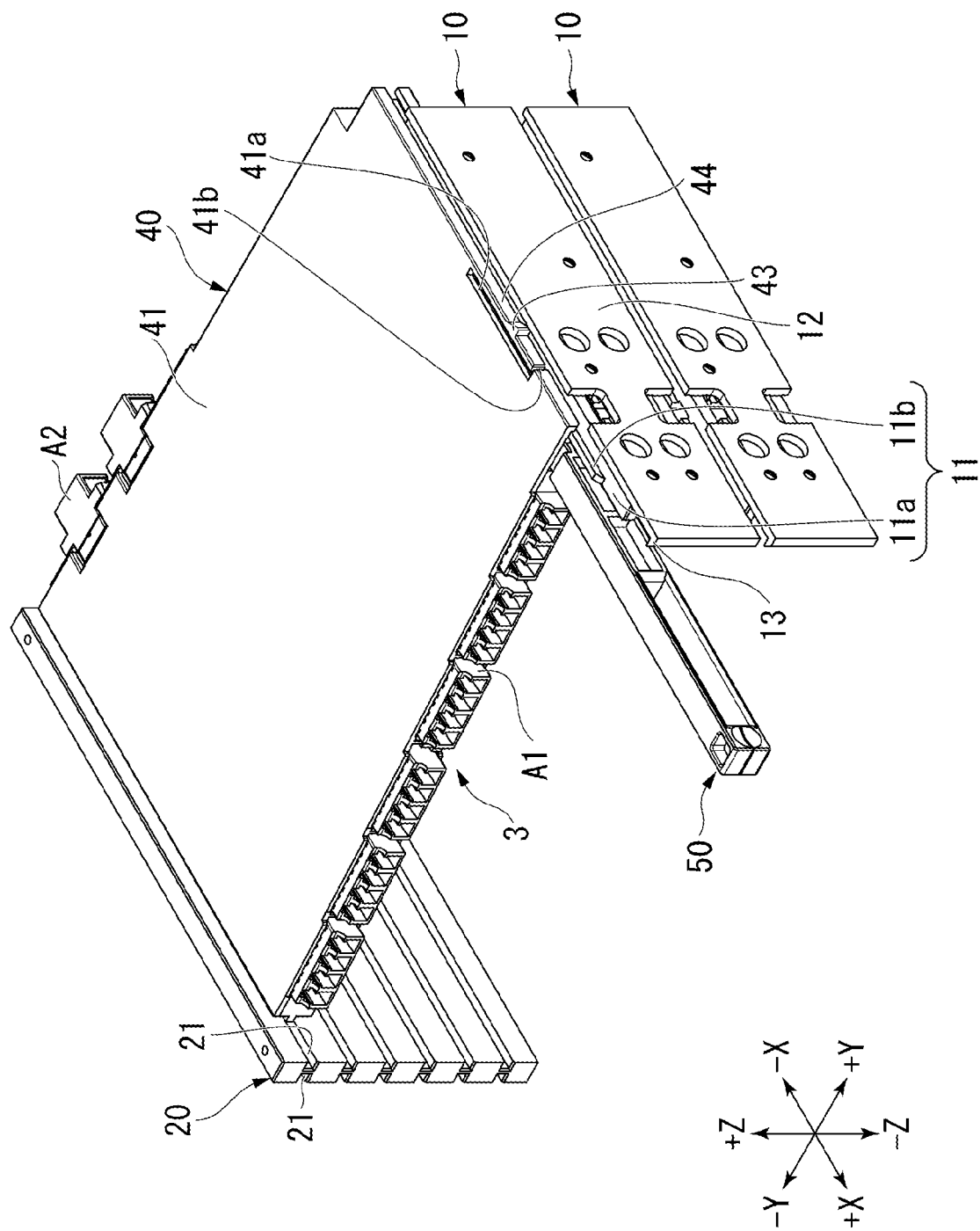
FIG. 2 is a perspective view showing a central rail, an optical wiring unit, and side rails extracted from FIG. 1.

The central rail 20 is located at a central portion in the left-right direction Y inside the housing 2. As shown in FIG. 2, the central rail 20 has a plurality of grooves 21 that extend in the front-rear direction X. Half of the grooves 21 are recessed leftward from a right side surface of the central rail 20, and the remaining half are recessed rightward from a left side surface of the central rail 20. The number of grooves 21 matches the number of optical wiring units 3.

In one or more embodiments, six optical wiring units 3 are arranged side by side in the up-down direction Z on the right side of the central rail 20. Additionally, six optical wiring units 3 are arranged side by side in the up-down direction Z on the left side of the central rail 20. That is, the optical termination box 1 of one or more embodiments includes a total of 12 optical wiring units 3. However, the number of optical wiring units 3 can be changed appropriately. Additionally, the optical wiring units 3 may be supported by, for example, a pair of side rails 10 without providing the central rail 20. That is, in the optical termination box 1, the optical wiring units 3 may not be arranged side by side in the left-right direction Y.

The optical wiring unit 3 located on the right side of the central rail 20 and the optical wiring unit 3 located on the left side thereof are substantially bilaterally symmetrical in shape. For example, the operating member 50 is arranged at a right end portion of the tray 30 in the right optical wiring unit 3, and the operating member 50 is arranged at a left end portion of the tray 30 in the left optical wiring unit 3. Correspondingly, the shape of the side rail 10 located on the right side and the side rail 10 located on the left side are substantially bilaterally symmetrical.

Hereinafter, the structures of the right optical wiring units 3 and side rail 10 will be described in detail, taking the right and left optical wiring units 3 and side rails 10 as representatives. That is, the following is also a description of the left optical wiring unit 3 and side rail 10. In the left-right direction Y, a side closer to the central rail 20 is referred to as "an inner side in the left-right direction Y", and the opposite side (a side closer to the side plate 2*c*) is referred to as "an outer side in the left-right direction Y". When viewed from the right optical wiring unit 3, the −Y side is the "inner side in the left-right direction Y", and the +Y side is the "outer side in the left-right direction Y".

Two side rails 10 are arranged side by side in the up-down direction Z at both outer end portions of the housing 2 in the left-right direction Y. As shown in FIG. 2, each side rail 10 has three slide support portions 11 that slidably support the optical wiring unit 3. That is, one side rail 10 is configured to support three optical wiring units 3. However, the number of slide support portions 11 included in the side rail 10 can be changed appropriately. For example, the side rail 10 may have six slide support portions 11. In this case, one side rail 10 may be arranged at each outer end portion of the housing 2 in the left-right direction Y.

Figure 3:
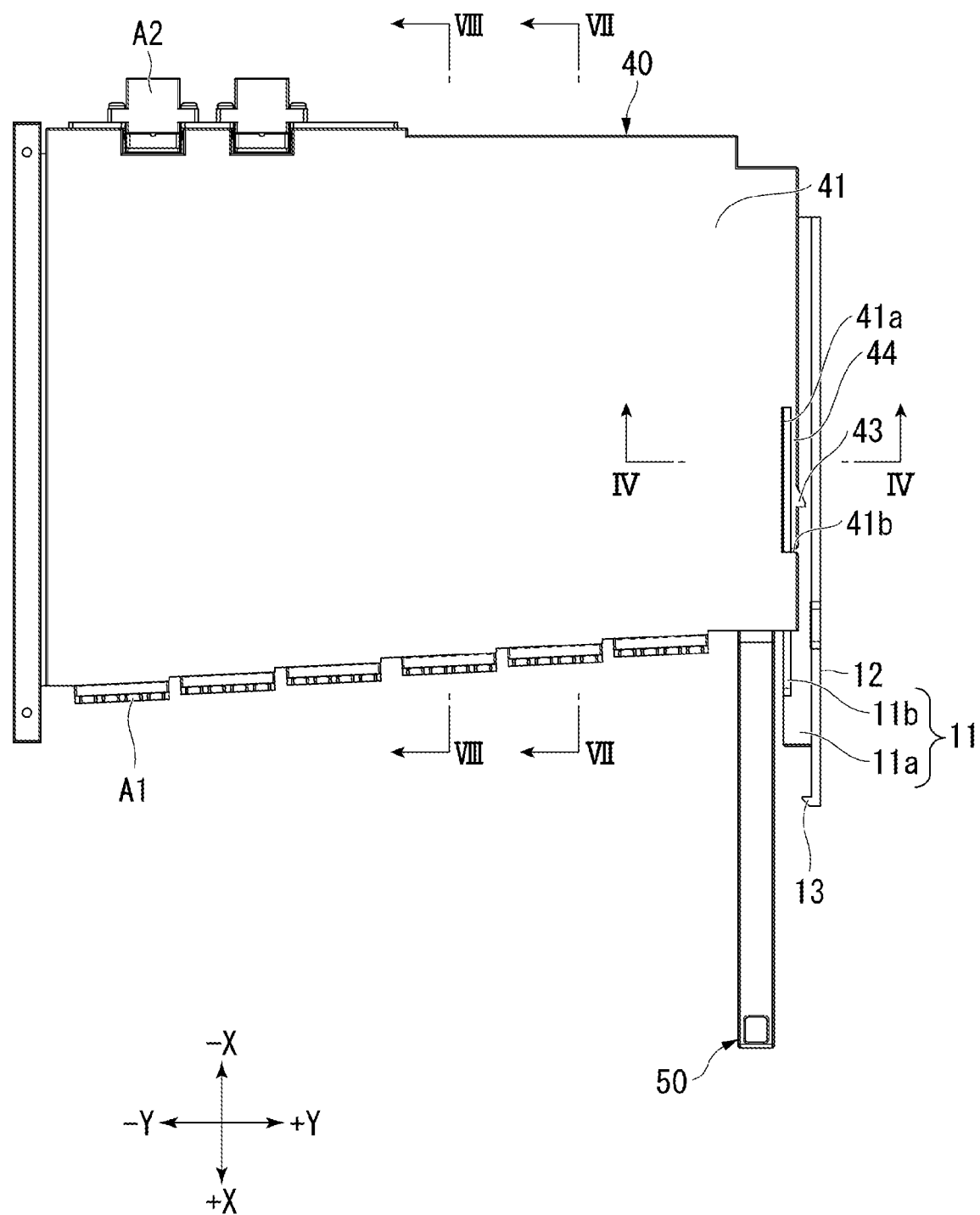
FIG. 3 is a plan view of FIG. 2 as viewed from above.
Figure 4:
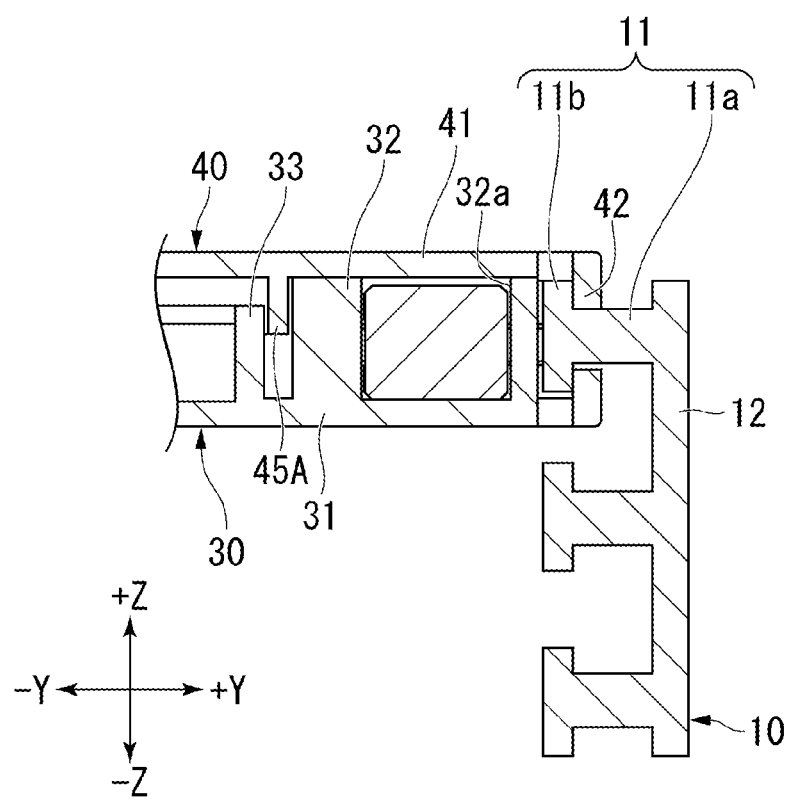
FIG. 4 is a sectional view taken along line IV-IV of FIG. 3.

As shown in FIGS. 3 and 4, the side rail 10 has a plurality of slide support portions 11, an attachment portion 12 and a rail-side restricting portion 13. The attachment portion 12 is a portion that attaches the side rail 10 to a side plate 2*c* of the housing 2, and has a plate shape that extends in the up-down direction Z and the front-rear direction X. A screw hole for fastening a screw is formed in the attachment portion 12. The plurality of slide support portions 11 are arranged side by side in the up-down direction Z and coupled to each other by the attachment portion 12.

Each slide support portion 11 has a rail body portion 11*a* and a projecting portion 11*b*. The rail body portion 11*a* protrudes inward in the left-right direction Y from the attachment portion 12. The projecting portion 11*b* protrudes upward and downward from an inner end portion of the rail body portion 11*a* in the left-right direction Y. The rail-side restricting portion 13 protrudes inward in the left-right direction Y from a front end portion of the attachment portion 12. The rail-side restricting portion 13 has a surface (rear surface) facing the rear side and an inclined surface facing the front side. The inclined surface of the rail-side restricting portion 13 is inclined inward in the left-right direction Y toward the rear side.

The lid body 40 covers the tray 30 from above. As shown in FIG. 3, the lid body 40 has a top plate 41, a side rib 42, and a first unit-side restricting portion 43. The top plate 41 has a plate shape that extends in the front-rear direction X and the left-right direction Y. As shown in FIG. 4, the side rib 42 protrudes downward from an outer end portion of the top plate 41 in the left-right direction Y. The projecting portion 11b of the side rail 10 is sandwiched between the side rib 42 and an outer wall portion 32 of the tray 30. Accordingly, the position of the optical wiring unit 3 in the left-right direction Y with respect to the side rail 10 is determined.

As shown in FIG. 3, the first unit-side restricting portion 43 protrudes outward in the left-right direction Y from the side surface of the top plate 41 (outer side surface in the left-right direction Y). The first unit-side restricting portion 43 has a surface (front surface) facing the front side and an inclined surface facing the rear side. The inclined surface of the first unit-side restricting portion 43 is inclined inward in the left-right direction Y toward the rear side.

A through-hole 41a is formed in the top plate 41 in the vicinity of the first unit-side restricting portion 43. The through-hole 41a penetrates the top plate 41 in the up-down direction Z and extends in the front-rear direction X. A cutout portion 41b that extends outward in the left-right direction Y is formed at the front side of an end portion of the through-hole 41a. An elastic piece 44 is formed between a side surface of the top plate 41 and the through-hole 41a. A rear end portion of the elastic piece 44 is connected to the top plate 41, and the elastic piece 44 is elastically deformable in the left-right direction Y with this connection portion as a base point. Although detailed description is omitted, the same through-hole, cutout portion, and elastic piece as those of the lid body 40 are also formed in the tray 30.

Figure 5:
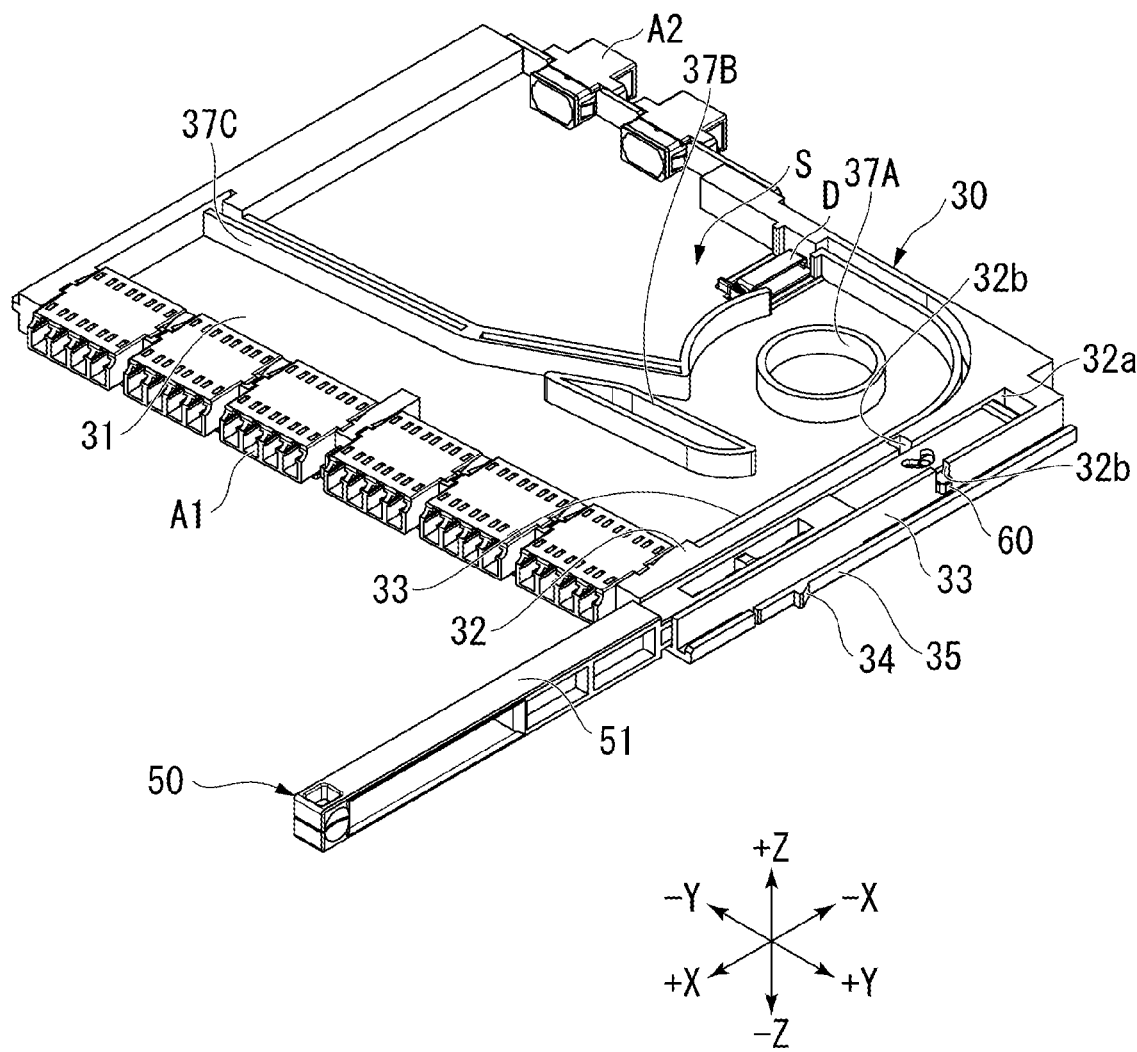
FIG. 5 is a perspective view of the optical wiring unit of FIG. 2 with a lid body removed.

The lid body 40 is fixed to the tray 30. As shown in FIG. 5, an accommodating space S is formed between the tray 30 and the lid body 40. The plurality of first adapters A1 and the plurality of second adapters A2 are attached to the tray 30. The plurality of first adapters A1 are arranged side by side in the left-right direction Y and protrude from the tray 30 to the front side. The plurality of second adapters A2 are arranged side by side in the left-right direction Y and protrude from the tray 30 to the rear side. Each first adapter A1 is configured so that a plurality of single-core connectors can be connected from the front side and the rear side. Each second adapter A2 is configured so that a multiple-core connector can be connected from the front side and the rear side.

An optical connector is connected to the second adapter A2 from the inside of the tray 30. The optical connector is, for example, a multi-fiber push-on (MPO) connector. The optical connector has a plurality of optical fibers (not shown) that connect the first adapter A1 and the second adapter A2 to each other, and an end portion of each optical fiber is provided with a single-core connector that is inserted into the first adapter A1 from the rear side. The optical connector, the optical fiber, and the single-core connector provided at the end portion of the optical fiber are accommodated in the accommodating space S.

The single-core connector inserted into the first adapter A1 from the front side is optically connected to another connector inserted into the second adapter A2 from the rear side through the optical fiber of the optical connector. In this way, the optical wiring unit 3 can aggregate and connect a plurality of single-core connectors to one multiple-core connector. As shown in FIG. 5, the accommodating space S is provided with a clamp D that bundles optical fibers.

As shown in FIG. 5, the tray 30 has a bottom plate 31, an outer wall portion 32, an inner wall portion 33, and a second unit-side restricting portion 34. The bottom plate 31 has a plate shape that extends in the front-rear direction X and the left-right direction Y. The top plate 41 and the bottom plate 31 face each other at a distance from each other in the up-down direction Z. A space between the top plate 41 and the bottom plate 31 is the aforementioned accommodating space S. The inner wall portion 33 and the outer wall portion 32 protrude upward from the bottom plate 31.

The inner wall portion 33 and the outer wall portion 32 have a portion that extends in the front-rear direction X, a curved portion, and a portion that extends in the left-right direction Y. Portions of the inner wall portion 33 and the outer wall portion 32 that extend in the front-rear direction X are arranged side by side at outer end portions of the bottom plate 31 in the left-right direction Y. Portions of the inner wall portion 33 and the outer wall portion 32 that extend in the left-right direction Y are arranged side by side at a rear end portion of the bottom plate 31. The inner wall portion 33 is arranged inside the accommodating space S with respect to the outer wall portion 32. The distance between the outer wall portion 32 and the inner wall portion 33 is substantially constant.

As shown in FIG. 4, the top plate 41 is in contact with an upper surface of the outer wall portion 32. Accordingly, the distance in the up-down direction Z between the bottom plate 31 and the top plate 41 is determined. Additionally, the dimension of the inner wall portion 33 in the up-down direction Z is smaller than that of the outer wall portion 32. For this reason, a gap in the up-down direction Z is formed between the inner wall portion 33 and the top plate 41. This gap is at least larger than the outer diameter of the optical fiber.

As shown in FIG. 5, the outer wall portion 32 is formed with a storage portion 32a that stores a portion of the operating member 50. The storage portion 32a is a recessed portion that is recessed downward from the upper surface of the outer wall portion 32 and extends in the front-rear direction X. The storage portion 32a is open toward the front side, and a front portion of the operating member 50 protrudes from the storage portion 32a to the front side. The operating member 50 is slidable in the front-rear direction X within the storage portion 32a.

The outer wall portion 32 has a pair of support portions 32b that slidably support the slide piece 60. Each support portion 32b is a recessed portion that is recessed downward from the upper surface of the outer wall portion 32. The pair of support portions 32b are formed to sandwich the storage portion 32a in the left-right direction Y. The pair of support portions 32b are arranged at the same position in the front-rear direction X.

The second unit-side restricting portion 34 protrudes outward in the left-right direction Y from a side surface (an outer end surface in the left-right direction Y) of the bottom plate 31. The second unit-side restricting portion 34 has a surface (front surface) that faces the front side and an inclined surface that faces the rear side. The inclined surface of the second unit-side restricting portion 34 is inclined inward in the left-right direction Y toward the rear side.

The unit-side restricting portions 34 and 43 of the tray 30 and the lid body 40 are arranged at the same position in the front-rear direction X and the left-right direction Y and are arranged apart from each other in the up-down direction Z. When the optical wiring unit 3 is set in the housing 2 and when the optical wiring unit 3 is placed on the side rail 10 and made to slide to the rear side, the inclined surfaces of the unit-side restricting portions 34 and 43 and the rail-side restricting portion 13 abut against each other. Accordingly, the elastic pieces 35 and 44 are elastically deformed inward in the left-right direction Y. With the elastic deformation of the elastic pieces 35 and 44, the unit-side restricting portions 34 and 43 are retracted inward in the left-right direction Y.

After the unit-side restricting portions 34 and 43 ride over the rail-side restricting portion 13 toward the rear side, the elastic pieces 35 and 44 are restored and deformed, and the front surfaces of the unit-side restricting portions 34 and 43 and the rear surface of the rail-side restricting portion 13 face other in the front-rear direction X. After that, when the optical wiring unit 3 is made to slide toward the front side with respect to the side rail 10, the unit-side restricting portions 34 and 43 abut against the rail-side restricting portion 13, and restricts further movement toward the front side of the optical wiring unit 3. In this case, the position of the optical wiring unit 3 is the aforementioned "pull-out position".

As shown in FIG. 5, the operating member 50 has a handle portion 51 that protrudes from the storage portion 32a of the tray 30 to the front side. The handle portion 51 is a portion that is operated when an operator makes the optical wiring unit 3 slide between the storage position and the pull-out position.

Although detailed description is omitted, the slide piece 60 is slidable in the left-right direction Y with respect to the operating member 50. The optical termination box 1 is configured such that the sliding of the optical wiring unit 3 is restricted when the slide piece 60 is located inside a front locking portion 11c or a rear locking portion 11d.

As shown in FIG. 5, the tray 30 further has tray-side fiber restricting portions 37A to 37C that protrude upward from the bottom plate 31 and is located within the accommodating space S. The first tray-side fiber restricting portion 37A has a cylindrical shape, and the second tray-side fiber restricting portion 37B has a substantially rectangular tubular shape. The third tray-side fiber restricting portion 37C has a double wall structure that extends in parallel in the left-right direction Y. The tray-side fiber restricting portions 37A to 37C have the function of restricting the position (wiring route) of the optical fiber from the first adapter A1 to the second adapter A2. The number, shape, and disposition of the tray-side fiber restricting portions 37A to 37C can be changed appropriately.

Figure 6:
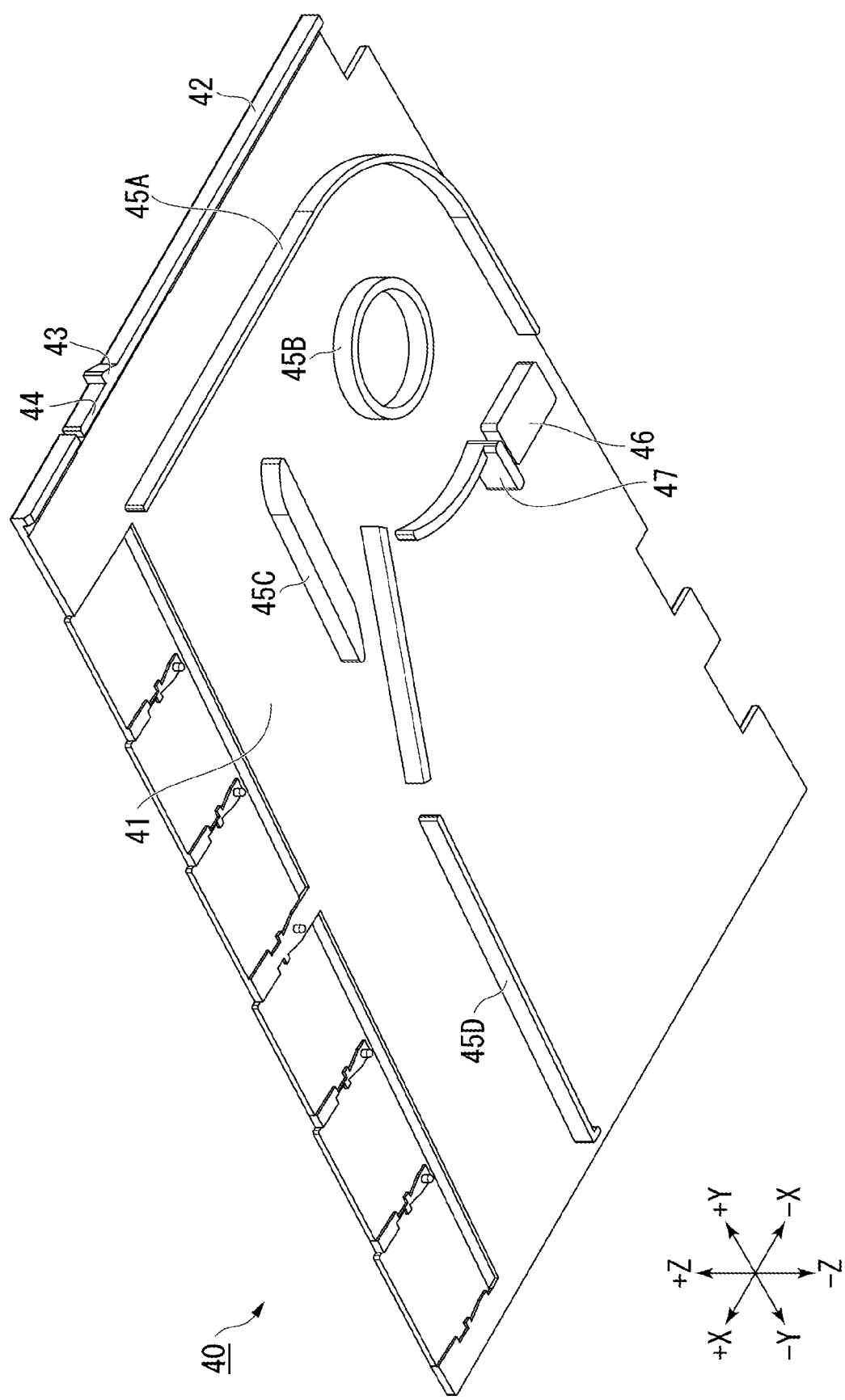
FIG. 6 is a perspective view of the lid body of FIG. 2 as viewed from below.

As shown in FIG. 6, the lid body 40 has an intermediate wall portion 45A that protrudes downward from the top plate 41. The intermediate wall portion 45A has a portion that extends in the front-rear direction X, a curved portion, and a portion that extends in the left-right direction Y. The intermediate wall portion 45A is configured to be inserted between the outer wall portion 32 and the inner wall portion 33 of the tray 30 (refer to FIGS. 4 and 7).

As shown in FIG. 6, the lid body 40 further has lid-side fiber restricting portions 45B to 45D, a peeling suppressing portion 46, and a restricting wall 47 that protrude downward from the top plate 41 and are located in the accommodating space S. The first lid-side fiber restricting portion 45B has a cylindrical shape smaller than the first tray-side fiber restricting portion 37A. The second lid-side fiber restricting portion 45C has a substantially rectangular columnar shape. The third lid-side fiber restricting portion 45D has a rib shape (plate shape) that extends in the left-right direction Y.

Figure 7:
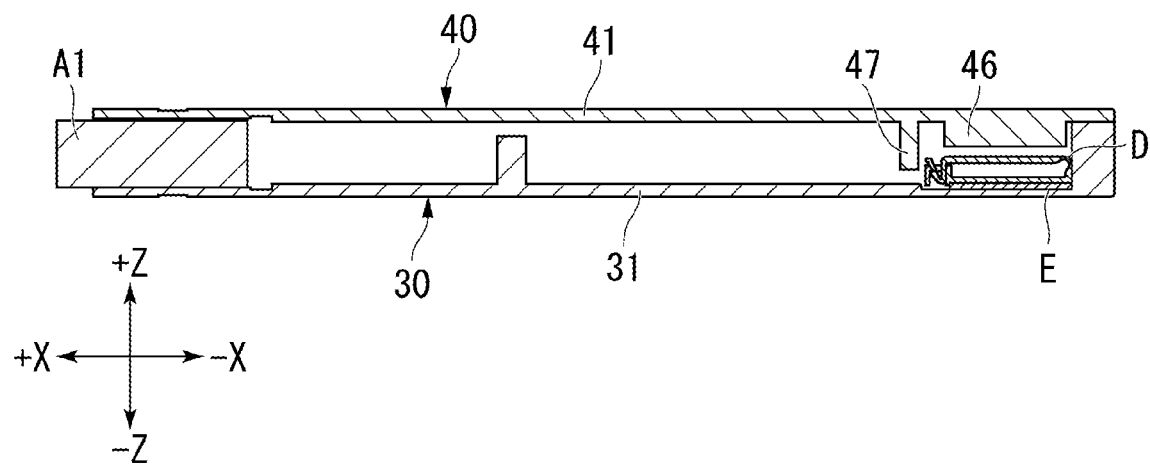
FIG. 7 is a sectional view taken along line VII-VII of FIG. 3.

As shown in FIG. 7, the clamp D is fixed to the bottom plate 31 by an adhesive portion E. The adhesive portion E may be, for example, an adhesive, or may be a double-sided tape or the like. The peeling suppressing portion 46 is arranged at a position facing the clamp D in the up-down direction Z. The restricting wall 47 is arranged adjacent to the clamp D and the peeling suppressing portion 46.

Figure 8:
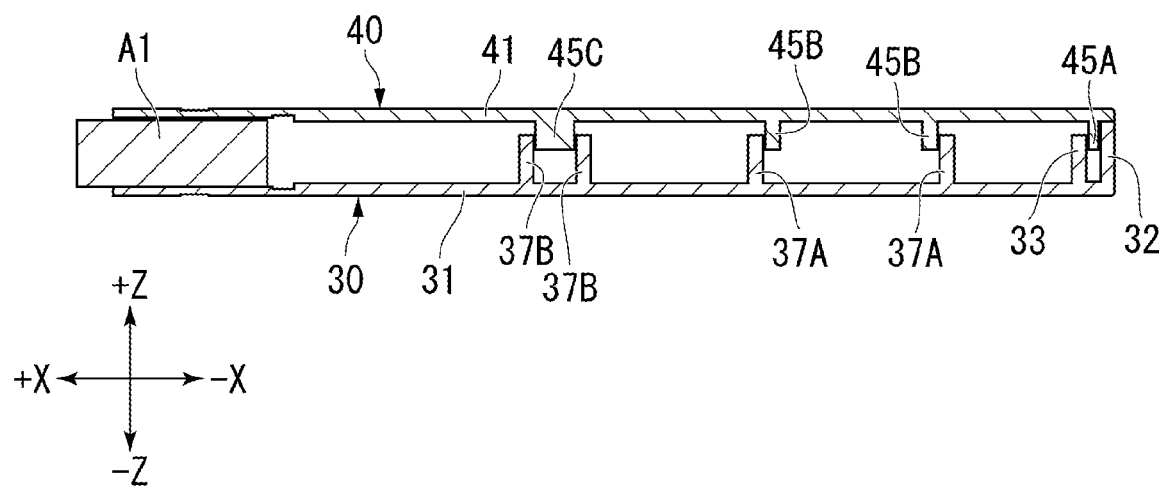
FIG. 8 is a sectional view taken along line VIII-VIII of FIG. 3.

As shown in FIG. 8, the first lid-side fiber restricting portion 45B is inserted into the first tray-side fiber restricting portion 37A, and the second lid-side fiber restricting portion 45C is inserted into the second tray-side fiber restricting portion 37B. Although not shown, the third lid-side fiber restricting portion 45D is also inserted into the third tray-side fiber restricting portion 37C. The dimensions of the tray-side fiber restricting portions 37A to 37C in the up-down direction Z are smaller than that of the outer wall portion 32. For this reason, a gap in the up-down direction Z is formed between the tray-side fiber restricting portions 37A to 37C and the top plate 41. This gap is at least larger than the outer diameter of the optical fiber.

Next, the operation of the optical wiring unit 3 configured as described above will be described.

As mentioned earlier, a plurality of optical fibers are accommodated in the accommodating space S of the optical wiring unit 3. When the optical wiring unit 3 is vibrated or turned upside down during use, it is conceivable that an optical fiber is sandwiched between the tray 30 and the lid body 40. In particular, an optical fiber is likely to be sandwiched between the outer wall portion 32 located at an outer periphery of the tray 30 and the top plate 41. When an optical fiber is sandwiched and pressed, there is a possibility that an increase in transmission loss of light may be caused.

Thus, in one or more embodiments, an inner wall portion 33 having a smaller dimension in the up-down direction Z than the outer wall portion 32 is provided adjacent to the outer wall portion 32. Also, the intermediate wall portion 45A is inserted between the outer wall portion 32 and the inner wall portion 33. According to such a configuration, since the inner wall portion 33 and the intermediate wall portion 45A are present, movement of the optical fiber to the vicinity of the outer wall portion 32 is restricted. Accordingly, a phenomenon that an optical fiber is sandwiched between the outer wall portion 32 and the top plate 41 can be suppressed. Also, since the gap between the inner wall portion 33 and the top plate 41 is larger than the outer diameter of the optical fiber, it is possible to avoid the sandwiching and pressing of an optical fiber between the inner wall portion 33 and the top plate 41.

The above-mentioned effects can be obtained even when the relationship between the tray 30 and the lid body 40 is reversed. Specifically, the outer wall portion 32 and the inner wall portion 33 may be formed on the lid body 40, and the intermediate wall portion 45A may be formed on the tray 30. That is, as long as one of the tray 30 and the lid body 40 has the outer wall portion 32 and the inner wall portion 33 and the other has the intermediate wall portion 45A, the effects can be obtained.

In a case where the tray-side fiber restricting portions 37A to 37C are in contact with the top plate 41, it is conceivable that an optical fiber is sandwiched between the tray-side fiber restricting portions 37A to 37C and the top plate 41. Thus, in one or more embodiments, a gap in the up-down direction Z, which is larger than the outer diameter of the optical fiber, is provided between the tray-side fiber restricting portions 37A to 37C and the top plate 41. For this reason, the phenomenon that an optical fiber is sandwiched and pressed between the tray-side fiber restricting portions 37A to 37C and the top plate 41 can be suppressed. Moreover, the lid-side fiber restricting portions 45B to 45D are inserted into the tray-side fiber restricting portions 37A to 37C. For this reason, the movement of the optical fiber such that the optical fiber rides over the tray-side fiber restricting portion 37A to 37C is restricted. Accordingly, the position of the optical fiber within the accommodating space S can be effectively restricted.

The above-mentioned effects can also be obtained even when the relationship between the tray 30 and the lid body 40 is reversed. Specifically, the tray-side fiber restricting portions 37A to 37C may be inserted into the lid-side fiber restricting portions 45B to 45D. That is, as long as one of the tray-side fiber restricting portions 37A to 37C and the lid-side fiber restricting portions 45B to 45D is inserted into the other, the effects can be obtained.

There is a possibility that the optical wiring unit 3 may be turned upside down and used. In this case, a force to peel off the adhesive portion E is exerted due to the weight of the clamp D. When the adhesive portion E is peeled off, there is a case where the clamp D moves within the accommodating space S, lateral pressure acts on the optical fiber, and the transmission loss of light is increased. Thus, in one or more embodiments, the peeling suppressing portion 46 is provided to face the clamp D in the up-down direction Z. For this reason, in a case where the adhesive portion E is partially peeled off due to the weight of the clamp D, the clamp D hits the peeling suppressing portion 46, and the weight of the clamp D is supported by the peeling suppressing portion 46. Accordingly, it is possible to suppress the progress of the peeling of the adhesive portion E. Moreover, the restricting wall 47 is provided adjacent to the peeling suppressing portion 46. For this reason, even when the clamp D is spaced apart from the bottom plate 31 due to the peeling of the adhesive portion E, the position of the clamp D can be restricted by the restricting wall 47.

The above-mentioned effects can also be obtained even when the relationship between the tray 30 and the lid body 40 is reversed. Specifically, the clamp D may be bonded to the top plate 41 by the adhesive portion E, and the peeling suppressing portion 46 may be formed on the tray 30. That is, as long as the clamp D is bonded to one of the tray 30 and the lid body 40 and the peeling suppressing portion 46 is formed on the other, the effects can be obtained. Similarly, as long as the clamp D is bonded to one of the tray 30 and the lid body 40, and the restricting wall 47 is formed on the other, the effects can be obtained.

In FIG. 1, the optical wiring unit 3 located on the right side of the central rail 20 and the optical wiring unit 3 located on the left side have the same structure, and may be turned upside down accommodated in the housing 2. In this case, the optical wiring unit 3 can be shared between the right side and the left side, and the manufacturing cost and management cost can be reduced. Also, in one or more embodiments, as described above, even when the optical wiring unit 3 is turned upside down and used, an optical fiber being pressed is suppressed.

As described above, the optical wiring unit 3 of one or more embodiments includes the tray 30 having the bottom plate 31 and the lid body 40 having the top plate 41 facing the bottom plate 31 in the up-down direction Z, the accommodating space S that accommodates the optical fiber is formed between the bottom plate 31 and the top plate 41, one of the tray 30 and the lid body 40 has the outer wall portion 32, and the inner wall portion 33 arranged inside the accommodating space S with respect to the outer wall portion 32, the other of the tray 30 and the lid body 40 has the intermediate wall portion 45A inserted between the outer wall portion 32 and the inner wall portion 33, and the inner wall portion 33 has a dimension in the up-down direction Z smaller than that of the outer wall portion 32. By virtue of such a configuration, even when the optical wiring unit 3 vibrates or is turned upside down and used, the sandwiching and pressing of an optical fiber between the tray 30 and the lid body 40 can be suppressed.

The tray 30 has the tray-side fiber restricting portions 37A to 37C that protrude into the accommodating space S from the bottom plate 31, the lid body 40 has the lid-side fiber restricting portions 45B to 45D that protrude into the accommodating space S from the top plate 41, and one of the tray-side fiber restricting portions 37A to 37C and the lid-side fiber restricting portions 45B to 45D may be inserted into the other. In this case, the position of the optical fiber in the accommodating space S can be effectively restricted, and the optical fiber being pressed can be suppressed.

The optical wiring unit 3 may include the clamp D arranged in the accommodating space S, the clamp D may be bonded to one of the tray 30 and the lid body 40 and the peeling suppressing portion 46 may be formed on the other of the tray 30 and the lid body 40, and the peeling suppressing portion 46 may protrude in the up-down direction Z from the bottom plate 31 or the top plate 41 and may face the clamp D in the up-down direction Z. In this case, the position of the optical fiber in the accommodating space S can be restricted by the clamp D, and the progress of peeling-off of the adhesive portion E due to the self-weight of the clamp D can be suppressed.

The optical termination box 1 of one or more embodiments may include the plurality of optical wiring units 3, the central rail 20 that supports the plurality of optical wiring units 3 to be slidable in the front-rear direction X, and the housing 2 that accommodates the plurality of optical wiring units 3 and the central rail 20, the plurality of optical wiring units 3 may be arranged to be divided into both sides (±Y sides) in the left-right direction Y orthogonal to both the up-down direction Z and the front-rear direction X with respect to the central rail 20, the optical wiring unit 3 located on one side in the left-right direction Y may have the lid body 40 located above the tray 30, and the optical wiring unit 3 located on the other side in the left-right direction Y may have the lid body 40 located above the tray 30. In this case, the optical wiring unit 3 can be shared between the right side and the left side, of the central rail 20 and the manufacturing cost and management cost can be reduced.

In addition, the technical scope of the present invention is not limited to the above-described embodiments, and various modifications can be made without departing from the spirit of the present invention.

For example, the tray 30 may not have the tray-side fiber restricting portions 37A to 37C, and the lid body 40 may not have the lid-side fiber restricting portions 45B to 45D. The clamp D, the peeling suppressing portion 46, and the restricting wall 47 may not be provided in the accommodating space S. The structures of the optical wiring units 3 may be different between the right side and the left side of the central rail 20. The side rail 10 may be integral with the side plate 2c of the housing 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical termination box
2: Housing

3: Optical wiring unit
20: Central rail
30: Tray
31: Bottom plate
32: Outer wall portion
33: Inner wall portion
37A to 37C: Tray-side fiber restricting portion
40: Lid body
41: Top plate
45A: Intermediate wall portion
45B: Lid-side fiber restricting portion
45C: Lid-side fiber restricting portion
45D: Lid-side fiber restricting portion
46: Peeling suppressing portion
D: Clamp
S: Accommodating space
X: Front-rear direction
Y: Left-right direction
Z: Up-down direction

What is claimed is:

1. An optical wiring unit comprising:
a tray that comprises a bottom plate; and
a lid body that comprises a top plate facing the bottom plate in an up-down direction, wherein
an accommodating space that accommodates an optical fiber is formed between the bottom plate and the top plate,
one of the tray and the lid body comprises:
an outer wall portion; and
an inner wall portion inside the accommodating space with respect to the outer wall portion,
the other of the tray and the lid body comprises an intermediate wall portion inserted between the outer wall portion and the inner wall portion,
the inner wall portion has a dimension in the up-down direction smaller than that of the outer wall portion,
the tray further comprises a tray-side fiber restricting portion that protrudes into the accommodating space from the bottom plate,
the lid body further comprises a lid-side fiber restricting portion that protrudes into the accommodating space from the top plate, and
one of the tray-side fiber restricting portion and the lid-side fiber restricting portion is inserted into the other of the tray-side fiber restricting portion and the lid-side fiber restricting portion.

2. An optical wiring unit comprising:
a tray that comprises a bottom plate;
a lid body that comprises a top plate facing the bottom plate in an up-down direction, wherein
an accommodating space that accommodates an optical fiber is formed between the bottom plate and the top plate,
one of the tray and the lid body comprises:
an outer wall portion; and
an inner wall portion inside the accommodating space with respect to the outer wall portion,
the other of the tray and the lid body comprises an intermediate wall portion inserted between the outer wall portion and the inner wall portion,
the inner wall portion has a dimension in the up-down direction smaller than that of the outer wall portion, and
the optical wiring unit further comprises:
a clamp disposed in the accommodating space and that is bonded to one of the tray and the lid body; and
a peeling suppressing portion disposed on the other of the tray and the lid body and that:
protrudes in the up-down direction from the bottom plate or the top plate, and
faces the clamp in the up-down direction.

3. An optical termination box comprising:
two or more of the optical wiring unit according to claim 1;
a central rail that supports the two or more of the optical wiring unit to be slidable in a front-rear direction; and
a housing that accommodates:
the two or more of the optical wiring unit, and
the central rail, wherein
the two or more of the optical wiring unit are disposed into both sides of the central rail in a left-right direction orthogonal to both of the up-down direction and the front-rear direction,
in the optical wiring unit on one side in the left-right direction, the lid body is disposed above the tray, and
in the optical wiring unit on the other side in the left-right direction, the tray is disposed above the lid body.

4. The optical wiring unit according to claim 1, further comprising:
a clamp disposed in the accommodating space and that is bonded to one of the tray and the lid body; and
a peeling suppressing portion disposed on the other of the tray and the lid body and that:
protrudes in the up-down direction from the bottom plate or the top plate, and faces the clamp in the up-down direction.

5. An optical termination box comprising:
two or more of the optical wiring unit according to claim 2;
a central rail that supports the two or more of the optical wiring unit to be slidable in a front-rear direction; and
a housing that accommodates:
the two or more of the optical wiring unit, and
the central rail, wherein
the two or more of the optical wiring unit are disposed into both sides of the central rail in a left-right direction orthogonal to both of the up-down direction and the front-rear direction,
in the optical wiring unit on one side in the left-right direction, the lid body is disposed above the tray, and
in the optical wiring unit on the other side in the left-right direction, the tray is disposed above the lid body.

6. An optical termination box comprising:
two or more of the optical wiring unit according to claim 4;
a central rail that supports the two or more of the optical wiring unit to be slidable in a front-rear direction; and
a housing that accommodates:
the two or more of the optical wiring unit, and
the central rail, wherein
the two or more of the optical wiring unit are disposed into both sides of the central rail in a left-right direction orthogonal to both of the up-down direction and the front-rear direction,
in the optical wiring unit on one side in the left-right direction, the lid body is disposed above the tray, and
in the optical wiring unit on the other side in the left-right direction, the tray is disposed above the lid body.

* * * * *